Figure 1:
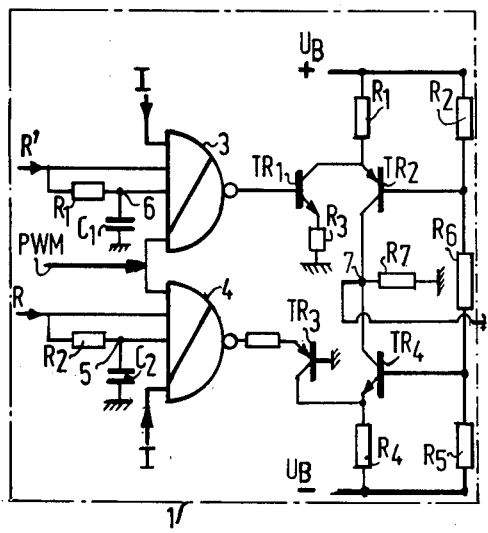

United States Patent [19]

Vermaes et al.

[11] 4,184,198

[45] Jan. 15, 1980

[54] THREE-PHASE VOLTAGE GENERATOR RESPONSIVE TO DC CONTROL PULSES

[75] Inventors: Paul I. Vermaes, Delft; Paul J. Vink, Amsterdam, both of Netherlands

[73] Assignee: Ultra Centrifuge, The Hague, Netherlands

[21] Appl. No.: 729,679

[22] Filed: Oct. 5, 1976

[30] Foreign Application Priority Data

Oct. 9, 1975 [NL] Netherlands .......................... 7511908

[51] Int. Cl.² .......................................... H02M 7/537
[52] U.S. Cl. ........................................ 363/71; 307/16; 307/82; 363/2
[58] Field of Search ................. 363/2, 65, 71, 72, 137; 307/16, 82

[56] References Cited

U.S. PATENT DOCUMENTS

| | | | |
|---|---|---|---|
| 2,916,687 | 12/1959 | Cronin | 363/71 |
| 3,448,366 | 6/1969 | Goff | 363/2 X |
| 3,718,853 | 2/1973 | Graf | 363/71 X |
| 3,943,429 | 3/1976 | Heintze | 363/71 |

Primary Examiner—William M. Shoop
Attorney, Agent, or Firm—Lewis H. Eslinger

[57] ABSTRACT

This invention relates to an electric supply circuit for a large number of multi-phase a.c. apparatus, particularly hysteresis motors of gas centrifugal machines, having circuits to form three-phase control pulses, control circuits for the through-connection between d.c. forms of the desired alternating voltage for one or a number of apparatus to be energized under the control of the control pulses and circuits for adapting the signal levels of the control pulses to the circuit for the formation of the alternating voltages, wherein a large number of circuits for the formation of the alternating voltage is controlled from a single control circuit.

5 Claims, 5 Drawing Figures

THREE-PHASE VOLTAGE GENERATOR RESPONSIVE TO DC CONTROL PULSES

The invention relates to an electric supply circuit for a large number of multi-phase a.c. apparatus, particularly hysteresis motors of gas centrifuges, having circuits to form three-phase control pulses, control circuits for forming the desired alternating voltage for one or a number of apparatus to be energized by switching between d.c. voltages under the control of control pulses and circuits for adapting the signal levels of the control pulses to the alternating voltage formation circuit. Such a supply circuit often comprises a circuit switching between the direct voltages and forming the alternating voltage for each apparatus to be energized and the associated control circuit. This combination is usually supplied as a single unit under the name of invertor. However, if a great number of similar apparatus have to be energized, such a combination is not economic. The object of the invention is to provide a cheaper solution.

According to the invention this is achieved by controlling a large number of circuits for the formation of the alternating voltage from a single control circuit. The more complicated control circuit, which has to meet severe requirements, is thus employed in common for a large number of circuits forming the alternating voltages. This also involves a spacially more favourable disposition, since the circuits forming the alternating currents can be arranged in stands near the loads, whilst the control circuits may be arranged at a distance, for example, in a control chamber. The invention provides furthermore the advantage that the part of the circuit furnishing the a.c. power, which part is expensive, can be made by mass production in well-specified units by manufacturers not being required to have knowledge about converters.

To the circuits forming one of the phases of the alternating voltage control signals are preferably applied having three different values. By controlling by one control signal capable of assuming three different values the risk of irreparable damage of the part forming the alternating voltage by disturbances in the connecting line or in the control unit is avoided.

Figure 2:
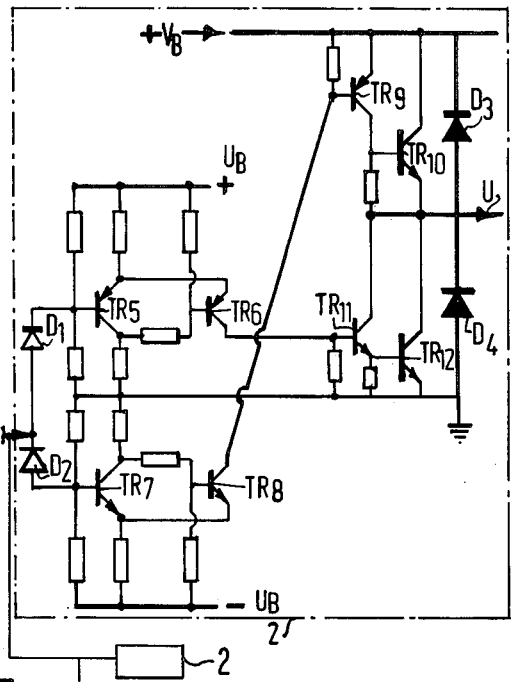
Figure 2:
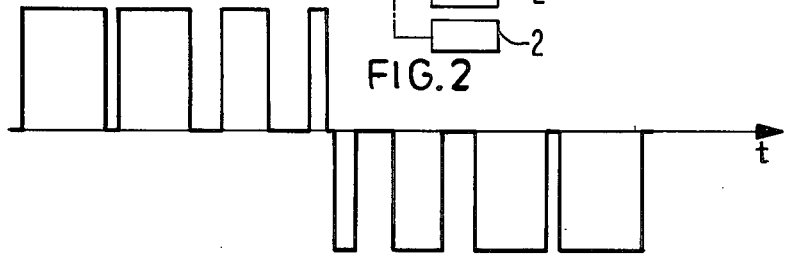
Figure 3:
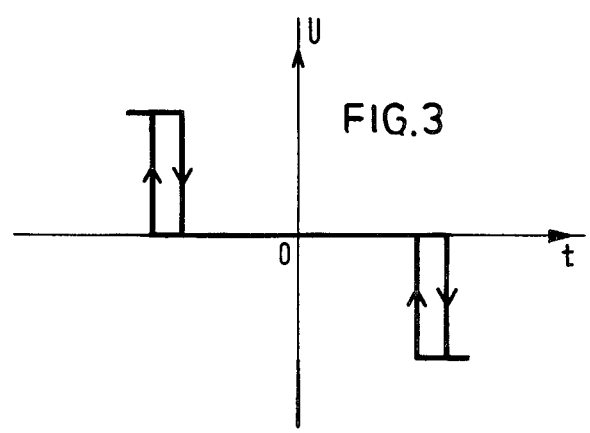
Figure 2A:
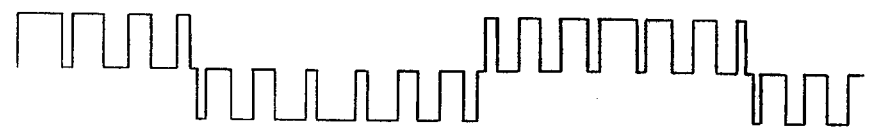

The invention will be described more fully with reference to the drawing of one embodiment. In the drawings is:

FIG. 1 a circuit-diagram of one embodiment;

FIG. 2 a graph of the output signal of the control circuit,

FIG. 2A is a graph of the output signal of the control circuit, similar to the graph of FIG. 2, but with an expanded time axis;

FIG. 3 a graph of the output signal by the switching blocks; and

Figure 3A:
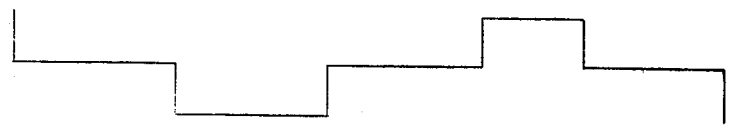

FIG. 3A represents the output voltage U, shown on the abbreviated axis in the graph of FIG. 3, with an expanded time axis wherein the output voltage U undergoes a negative transition from zero level to a negative level when the duty cycle of the negative portion of the waveform shown in FIGS. 2 and 2A exceeds some predetermined amount, wherein the output voltage U undergoes a positive transition from the negative level to the zero level when the duty cycle of the negative portion of the waveform in FIGS. 2 and 2A is less than another predetermined amount, and wherein the output voltage U undergoes a positive transition from the zero level to the positive level when the duty cycle of the positive portion of the waveform shown in FIGS. 2 and 2A exceeds yet another predetermined amount.

Referring to the drawing the outlined block 1 forms one phase of the control circuit and the outlined block 2 is a circuit controlled by the control circuit 1 for the formation of one phase of the alternating voltage.

In one type of application for providing a three-phase alternating voltage, three circuits, each similar to control circuit 1, are provided. Each of these three circuits controls a respective circuit similar to circuit 2.

For example, if one apparatus, or load, is to be supplied with a three-phase voltage designated R, S and T, then three separate control circuits 1 ($1_R$, $1_S$, $1_T$) are provided, these three control circuits being connected to three circuits 2 ($2_R$, $2_S$, $2_T$), respectively. The voltages produced by circuits $2_R$, $2_S$, $2_T$ all are supplied to the one apparatus or load. Now, let it be assumed that control circuits $1_R$, $1_S$, $1_T$ are to be used to supply three-phase voltage R, S, T to two apparatuses, or loads. Then control circuit $1_R$ is connected in common to two circuits $2_R$, $2'_R$; control circuit $1_S$ is connected in common to two circuits $2_S$, $2'_S$; and control circuit $1_T$ is connected in common to two circuits $2_T$, $2'_T$. It is appreciated that if three apparatus or loads are to be supplied with three-phase voltage, then control circuit $1_R$ is connected in common to three circuits $2_R$, $2'_R$, $2''_R$; control circuit $1_S$ is connected in common to three circuits $2_S$, $2'_S$, $2''_S$; and control circuit $1_T$ is connected in common to three control circuits $2_T$, $2'_T$, $2''_T$. FIG. 1 represents control circuit $1_R$ connected in common to three circuits $2_R$, $2'_R$, $2''_R$. The number of circuits 2 connected to each control circuit 1 can be increased as desired, and is equal to the number of apparatuses or loads which are driven.

To the input of the control circuit 1 is connected the output R of a ring counter and the inverse R' thereof. The designation R represents the phase controlled by said control circuit. The control circuit 1 is formed by NAND gates with Schmitt trigger inputs. The NAND gates 3, 4 are controlled by said ring counter, which can enable a gate for the output signal PWM of a pulse width modulator. The gates can be blocked by a blocking signal I. The RC networks R1C1 (6) and R2C2 (5) at the input of the gates 3, 4 determine a short time period in which the control signal is zero at the changeover of the sign of the signal. The circuit is formed by the transistors TR1, TR2, TR3 and TR4 with the associated resistors R1, R2, R3, R4, R5, R6 and R7. This circuit comprises two identical, but complementary current sources (TR2 and TR4 respectively), which are switched by TR1 and TR3 respectively. The currents are joined in resistor R7 and provide the adaptation unit signal, which may assume three values, i.e. positive, zero and negative. The output signal appears at point 7 and has the shape of the pulse width modulated signal of FIG. 2. The interpretation of this adaptation unit signal by the switching blocks 2 results in an output voltage as illustrated in FIG. 3.

The input diodes D1 and D2 of the circuit 2 forming the alternating current distinguish between positive and negative input signals. The input signals enable in dependence upon the sign one of the Schmitt triggers, formed by TR5, TR6 with the associated resistors and TR7, TR8 with the associated resistors respectively. The output signals of the triggers, derived from the collectors of the transistors TR6 and TR8 respectively govern the respective switching blocks which switch between the direct supply voltage $+VB$ and d.c. earth.

The input signals for the switching blocks comprising the transistors TR9, TR10 and TR11, TR12 and the feedback diodes D3 and D4 respectively can assume three level values, i.e. positive, zero and negative. The transistors TR10 and TR12 pass current in one direction, whereas the diodes D3 and D4 pass the load current in the other direction. When the input signals are zero, neither of the two branches is active. The output signal appears at the output terminal U and is represented, as shown in FIG. 3, to have a hysteresis characteristic.

It should be noted that the control signal can be acted upon by the circuit forming the alternating voltage. It is, for example, possible to block the control signal with the aid of a discriminator circuit, when the supply voltage VB lies beyond a given tolerance limit.

What we claim is:

1. Apparatus for supplying plural-phase a.c. voltages to devices, such as hysteresis motors of gas centrifugal machines, comprising a source of pulse width modulated signals; a single control circuit for generating control pulses, said control circuit including a respective control means associated with a respective phase of said plural-phase a.c. voltages, said control means being responsive to said pulse width modulated signals for generating control pulses for the phase with which said respective control means is associated; and plural voltage generating means coupled to said control means for receiving said control pulses therefrom, each of said voltage generating means including a pulse generator stage responsive to said control pulses and an output stage connected to said pulse generator stage for switching an output voltage between d.c. voltage levels, whereby a plural-phase a.c. voltage is derived from the output stages of respective voltage generating means coupled to corresponding ones of said control circuits.

2. The apparatus of claim 1 wherein said control circuit includes three control means associated with three phases, respectively, of three-phase a.c. voltages, and wherein a three-phase a.c. voltage is derived from the output stages of three voltage generating means which are coupled to said three control means, respectively.

3. The apparatus of claim 1 wherein each of said control means includes a switching circuit for generating said control pulses with relatively high, low and intermediate levels, respectively; and wherein said pulse generator stage in each of said voltage generating means includes trigger circuit means energized in response to said relatively high and low levels of said control pulses to produce first and second outputs, respectively, and inhibited in response to said intermediate level of said control pulses to produce a zero-level output, and said output stage in each of said voltage generating means comprises a source of two d.c. voltage levels and means to switch an output voltage therefrom between said two d.c. voltage levels in accordance with the outputs produced by said trigger circuit means.

4. The apparatus of claim 3 wherein said trigger circuit means comprises first and second Schmitt trigger circuits; said first Schmitt trigger circuit being energized by a control pulse of relatively high level, said second Schmitt trigger circuit being energized by a control pulse of relatively low level, and both Schmitt trigger circuits being inhibited by a control pulse of said intermediate level.

5. The apparatus of claim 4 wherein said means to switch an output voltage included in said voltage generating means comprises a first transistor switch responsive to the energization of said first Schmitt trigger circuit for coupling one of said d.c. voltage levels from said source to an output terminal, a second transistor switch responsive to the energization of said second Schmitt trigger circuit for coupling the other of said d.c. voltage levels from said source to said output terminal, and diodes for conducting load current in a direction opposite to the conduction direction of said first and second transistor switches.

* * * * *